United States Patent [19]

Aoki et al.

[11] Patent Number: 4,553,170
[45] Date of Patent: Nov. 12, 1985

[54] ELECTRONIC CAMERA

[75] Inventors: Harumi Aoki; Tahei Morisawa; Koji Suzuki; Kimiaki Ogawa, all of Tokyo, Japan

[73] Assignee: Asahi Kogaku Kogyo Kabushiki Kaisha, Japan

[21] Appl. No.: 601,469

[22] Filed: Apr. 18, 1984

[30] Foreign Application Priority Data

Apr. 30, 1983 [JP] Japan ................................. 58-76472

[51] Int. Cl.$^4$ .............................................. H04N 5/76
[52] U.S. Cl. ..................................... 358/225; 358/55; 352/136; 354/224
[58] Field of Search ............... 358/225, 226, 228, 227, 358/224, 213, 209, 85, 906, 909, 41, 335; 354/155, 152, 219, , 224, 241, 245, 246, 243.1; 352/136, 137, 140

[56] References Cited

U.S. PATENT DOCUMENTS

| | | | |
|---|---|---|---|
| 3,705,764 | 12/1972 | Reinsch | 352/121 |
| 3,826,567 | 7/1974 | Vockenhuber et al. | 352/137 |
| 3,833,758 | 9/1974 | Ferrari | 358/906 |
| 3,918,076 | 11/1975 | Shono | 354/219 |
| 4,079,396 | 3/1978 | Iura et al. | 354/152 |
| 4,104,682 | 8/1978 | Hosoe et al. | 354/25 |
| 4,108,543 | 8/1978 | Leistner | 352/121 |
| 4,194,817 | 3/1980 | Staudacher et al. | 352/169 |
| 4,239,361 | 12/1980 | Harvey | 354/145 |
| 4,279,488 | 7/1981 | Hines | 354/145 |
| 4,366,501 | 12/1982 | Tsunekawa et al. | 358/310 |

FOREIGN PATENT DOCUMENTS 2229615 1/1974 Fed. Rep. of Germany ...... 352/140

*Primary Examiner*—Thomas W. Brown
*Assistant Examiner*—Robert Lev
*Attorney, Agent, or Firm*—Sughrue, Mion, Zinn, Macpeak, and Seas

[57] ABSTRACT

An electronic camera capable of both still picture photographing and motion picture photographing in which one operation can be switched over to the other with ease and in which a bright image of the object is provided in the viewfinder with little attenuation in the video signal level. Upon selection of the motion picture photographing mode, the image reflecting mirror is automatically retracted from the photographing optical path and the focal plane shutter is maintained open. The image reflecting mirror drive mechanism and the focal plane shutter drive mechanism are used for both still picture photographing and motion picture photographing operations. Also, the shutter release switch is used for both operations. In the motion picture photographing mode, the degree of opening of the aperture opening and closing mechanism is changed in accordance with the luminance of the image being photographed, while for still picture photographing, the exposure is controlled with the focal plane shutter.

5 Claims, 4 Drawing Figures

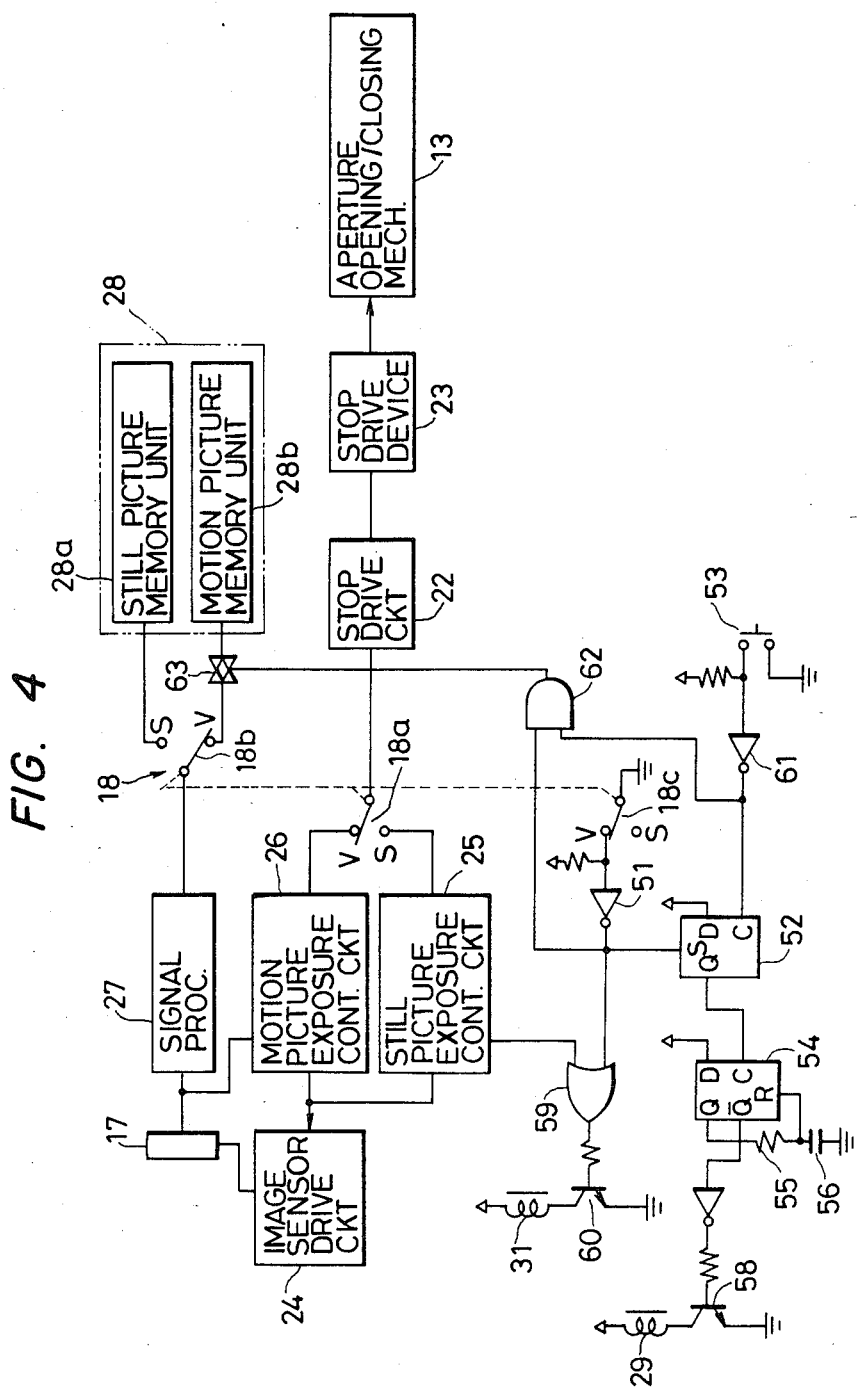

ELECTRONIC CAMERA

BACKGROUND OF THE INVENTION

The present invention relates to an electronic camera incorporating an image reflecting mirror in which both still picture and a motion picture photographing operations can be carried out and switched over to each other. More particularly, the invention relates to a changeover device for such a camera.

In an electronic camera, an image pickup device such as a solid state image pickup element provides electrical signals indicative of the brightness of the image of an object being photographed, and these signals are stored on a magnetic disc or in a semiconductor memory. The electronic camera is advantageous in that it uses no film which requires chemical treatment, and the pictures taken by the camera can be reproduced on a television set immediately. A variety of electronic cameras has been proposed to replace conventional cameras which use film.

In the electronic camera, instead of film, an image pickup device is used. However, the essential components of the camera mechanism, such as the exposure control device, that is, components other than the image pickup device, are generally the same as those used in the conventional film camera. That is, the electronic camera achieves exposure operation utilizing a metering device, shutter and lens stop, the same as a still-type film camera.

An electronic camera of course has a lens and image pickup device. If the electronic camera is coupled to a motion picture recording device such as a video tape recorder, it is theoretically possible to use the electronic camera as a video camera.

A viewfinder in such an electronic camera may be single-lens type optical viewfinder with an image reflecting mirror or a half-silvered mirror, a typical example of which is a quick return mirror, or an electronic viewfinder. The optical viewfinder using a quick return mirror is disadvantageous in that it has moving parts; however, it is advantageous in that the viewfinder image is bright and the light beam to the image pickup device is not attenuated by the viewfinder.

In the case where a quick return mirror is used in a video camera in which both motion picture photographing operations and still picture photographing operations can be performed, it is necessary that, in the motion picture photographing operation, the quick return mirror be retracted from the photographing optical path and that the shutter for taking still pictures be fully opened. This condition corresponds to a so-called "bulb photographing condition" in still picture photographing operations as far as the quick return mirror and the shutter are concerned. Motion picture photographing operations are of course different in procedure from still picture bulb photographing, and the mechanism for this purpose must be simple. However, no electronic camera with a quick return mirror capable of both still picture and motion picture photographing operations which can be selectively switched over to each other has been realized as yet.

For instance, in a still picture bulb photographing operation, while the release button is depressed, the mirror is retracted and the shutter is released. In order to use this mechanism for motion picture photographing operations, it is necessary to additionally provide a release button for taking motion pictures or to start the motion picture recording operation simultaneously with the retraction of the mirror. However, the former method is disadvantageous in that the operation is intricate, and the latter method is also disadvantageous in that the recording operation cannot be carried out when desired.

In the case where, in addition to the still picture bulb photographing mechanism, a mirror retracting mechanism and a shutter releasing mechanism are provided, the mechanisms themselves are intricate. If these mechanisms are not operated simultaneously for motion picture photographing operations, the shutter will be released during nonphotographing periods, and hence a high intensity light beam may reach the image pickup element, damaging the latter.

SUMMARY OF THE INVENTION

Overcoming these drawbacks, the invention provides an electronic camera in which a still picture photographing operation and a motion picture photographing operation can be switched over to each other, and which includes a changeover switch for switching the still picture photographing operation and the motion picture photographing operation over to each other, a focal plane shutter, a drive mechanism for driving the focal plane shutter, an image reflecting mirror, a drive mechanism for driving the image reflecting mirror, and a shutter release switch used for both types of photographing operations. In this camera, the image reflecting mirror is retracted from the photographing optical path when the shutter release button is depressed and when the changeover switch is set to select the motion picture photographing operation, the focal plane shutter being caused to be open when the changeover switch selects the motion picture photographing operation.

BRIEF DESCRIPTION OF THE DRAWINGS

FIG. 4 is a circuit diagram, partly as a block diagram, showing an example of a drive circuit in the electronic camera of the invention.

DESCRIPTION OF THE PREFERRED EMBODIMENTS

The invention will be described with reference to preferred embodiments shown in the accompanying drawings.

Figure 1:
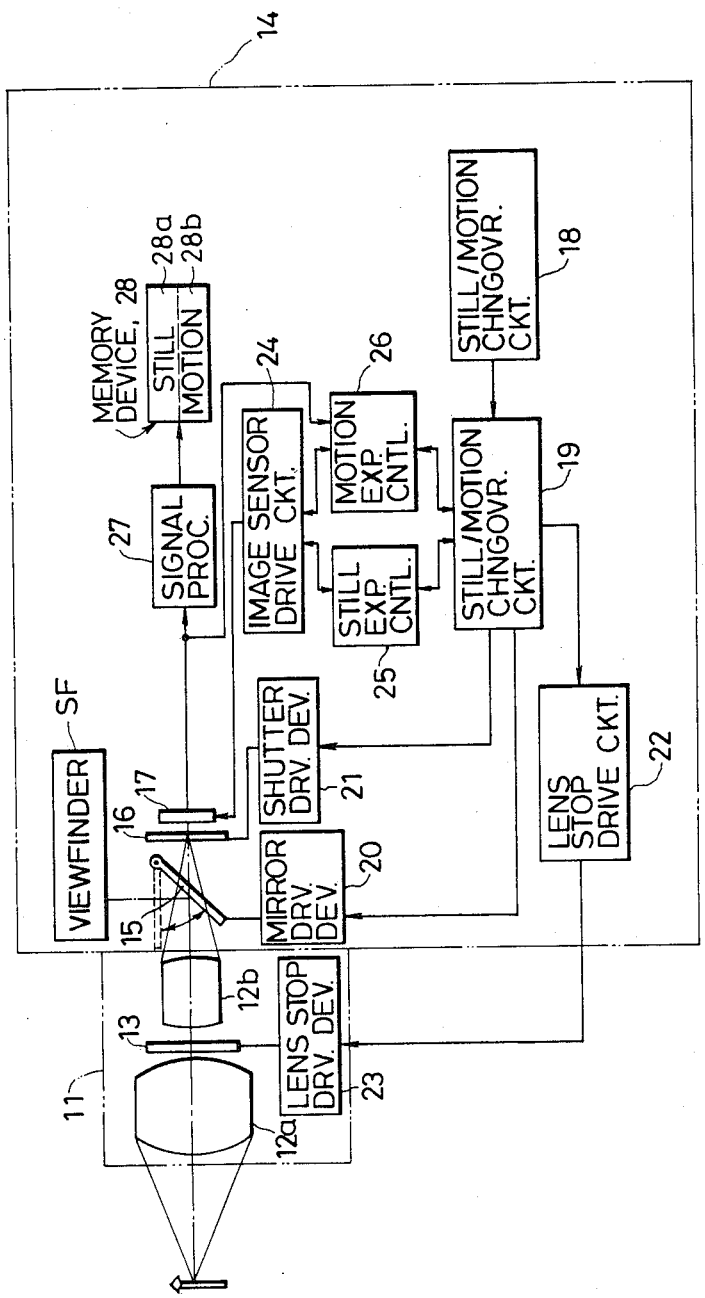
FIG. 1 is a block diagram showing the arrangement of an electronic camera according to the invention.

FIG. 1 is a block diagram showing the fundamental arrangement of an electronic camera according to the invention. As shown in FIG. 1, the photographing lens 11 of the camera includes lens elements 12a and 12b. An aperture opening and closing mechanism 13 is provided at the pupil position between the lens elements 12a and 12b. A quick return mirror (image reflecting mirror) 15, a focal plane shutter 16, and an image sensor (image pickup device) 17 are arranged in the camera body 14 in the stated order from the side of the photographing lens 11. A light beam reflected from the quick return mirror 15 is used in still picture photographing operations.

The quick return mirror 15 and the focal plane shutter 16 are electromagnetically driven by a mirror drive device 20 and a shutter drive device 21, respectively, in response to output signals from a still/motion changeover circuit 19 controlled by a still/motion changeover switch 19. Discharging, reading and storing the charge in the image sensor 16 are carried out by an image sensor drive circuit 24, a still picture exposure control circuit 25 and a motion picture exposure control circuit 26 which are selectively operated under the control of the still motion changeover circuit 1, a signal processing circuit 27, and a memory device 28 including a still picture memory unit 28a and a motion picture memory unit 28b which are selectively operated as described below.

Figure 2:
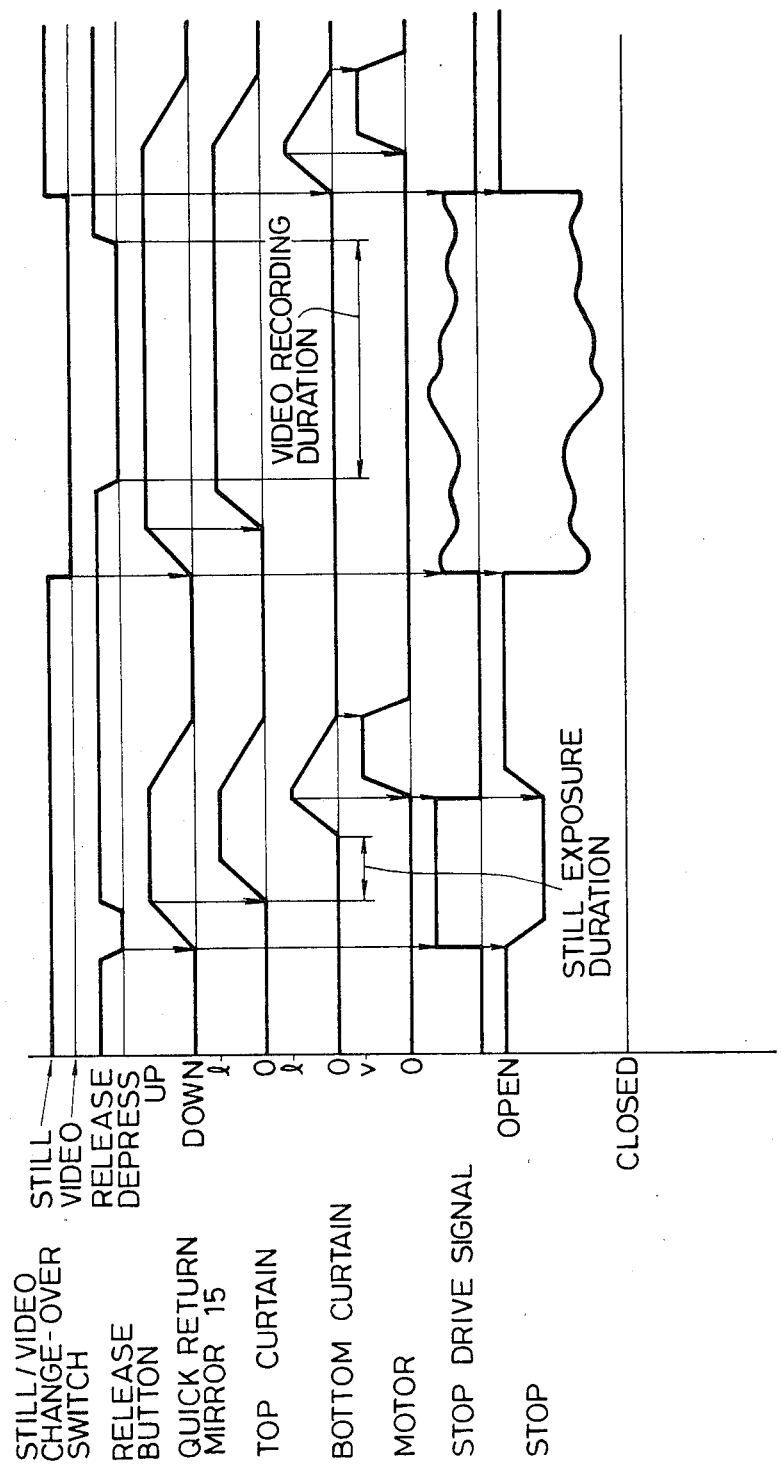
FIG. 2 is a timing chart showing the operating characteristic of the electronic camera of FIG. 1.

FIG. 2 is a timing chart for a description of an example of the operation of the electronic camera according to the invention. First, the still picture photographing operation will be described.

The still/motion changeover switch 18 is operated to select the still picture photographing operation. When, under this condition, the shutter release button (not shown) is operated (depressed), the mirror drive device 20 is operated by the output of the changeover circuit 19 so that the quick return mirror 14 is electromagnetically retracted from the photographing optical path. This operation is obtained by designing the camera as follows: The quick return mirror 15 is urged upwardly (to be retracted from the optical path) by a spring, for instance. Then, the quick return mirror 15 is thus lifted by the mirror drive device 20 when, for instance, a release magnet is activated to release the locking member.

The lens stop drive device 23 is operated by the output of the lens stop drive circuit 22 so that the aperture operating and closing mechanism 13 is operated to provide a required degree of opening, and then the focal plane shutter 16 is operated by the shutter drive device 21. The focal plane shutter 16 includes a top curtain and a bottom curtain, as is well known in the art. For instance, the locked top curtain is run with the aid of an elastic force by releasing it in association with the retraction of the quick return mirror 15 to its upper position. Then, in a period of time determined by a still picture exposure control circuit, the shutter drive 21 controls a bottom curtain release magnet to run the bottom curtain. Thus, exposure is correctly carried out. Thereafter, the aperture opening and closing mechanism is restored by the lens stop drive circuit 22 and the lens stop drive device 23, thus providing the full aperture.

After the exposure, the image sensor 17 is scanned by the image sensor drive circuit 24 for only one field period or one frame period, and the charge stored in the image sensor during the exposure is read by the signal processing circuit 27. The output video signal of the signal processing circuit 27, after being suitably processed, is stored in the memory device 28 (28a in this case), which may be a magnetic disc or semiconductor memory.

On the other hand, the quick return mirror 15 and the focal plane shutter 16 are restored while their drive forces are charged by a motor (not shown). That is, the quick return mirror 15 is held in the photographing optical path against the elastic force, and the top and bottom curtains of the focal shutter are wound against the elastic force.

When the motion picture photographing operation is selected by the changeover switch 18, the motion picture exposure control circuit 26 is selected by the changeover circuit 19, and the motion picture memory unit 28b is selected in the memory device 28. At the same time, the still/motion changeover circuit 19 applies a signal to the shutter drive 21. As a result, as in the still picture photographing operation, the release magnet of the quick return mirror 15 is activated to retract it from the photographing optical path, and the shutter drive device 21 is operated to hold the focal plane shutter open. In this case, the selected motion picture exposure control circuit 26 causes the bottom curtain release magnet to block the running of the bottom curtain. Accordingly, as the quick return mirror 15 is lifted, the top curtain of the focal plane shutter is run, but the bottom curtain is not run. Thus, the focal plane shutter is held open. At the same time, a lens stop drive signal for motion pictures is produced by the still/motion changeover circuit 19 and the lens stop drive circuit 22 with which the degree of opening of the aperature opening and closing mechanism 13 is continuously changed according to the average luminance of the object. This means that an image of the photographed object, the brightness of which is continuously controlled by the aperture opening and closing mechanism 13, is applied to the image sensor 17. Therefore, the picture can be suitably observed with a conventional electronic viewfinder.

When, under this condition, the shutter release switch, which is operated in common with the switch used for the still picture photographing operation, is operated, a vertical synchronizing signal is produced continuously to allow the image sensor drive circuit 24 to scan the image sensor 17. As a result, the continuous video signal provided by the signal processing circuit 27 is stored in the motion picture memory unit 28b to provide motion pictures. In the motion picture photographing operation, the output of the image sensor 17 is further applied to the motion picture exposure control circuit 26, which produces in response thereto a luminance signal corresponding to the average brightness of the image. The output of the control circuit 26 is applied, as a lens stop drive signal, through the still motion changeover circuit 19 and the lens stop drive circuit 22 to the lens stop drive device 23 so that the degree of opening of the aperture opening and closing mechanism 13 is continuously controlled.

When the changeover switch 18 is operated to select the still picture photographing mode, the bottom curtain release magnet of the focal plane shutter 16 is activated with the aid of the changeover circuit 19 and the shutter drive device 21 so that the focal plane shutter 16 is closed. At the same time, the lens stop drive signal is turned off, and the aperture opening and closing mechanism is restored to provide full aperture. After the bottom curtain of the focal plane shutter 16 has been run, as in the still picture photographing operation, the drive forces are restored being charged by the motor (not shown).

Figure 3:
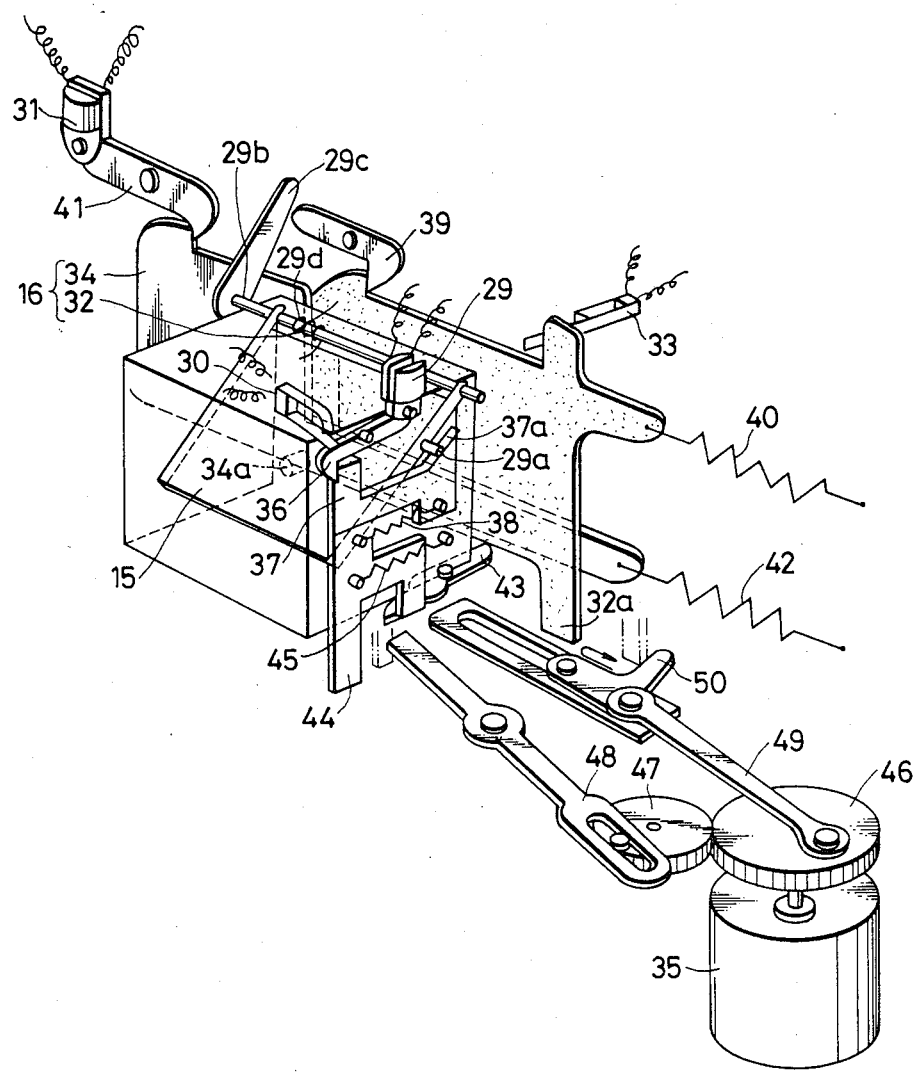
FIG. 3 is a perspective view showing examples of a focal plane shutter and a quick return mirror in the electronic camera of the invention.

FIG. 3 shows an example of the above-described quick return mirror 15 and focal plane shutter 16. The shutter 16 includes the top curtain 32 and the bottom curtain 34 as described before. The top curtain and the bottom curtain are pulled by a top curtain spring 40 and a bottom curtain spring 42, respectively, towards the righthand side in FIG. 3. A top curtain locking pawl 39 and a bottom curtain locking pawl 41 hold the top curtain 32 and the bottom curtain 34 at the charged positions against the forces of the springs 40 and 42, respectively. The top curtain locking pawl 39 and the bottom curtain locking pawl 41 are disengaged from the top curtain 32 and the bottom curtain 34 by a top curtain unlocking lever 29c and a bottom curtain releasing magnet 31, respectively. The shutter 16, that is, the top curtain 32 and the bottom curtain 34, are elastically charged by a motor 35. When the motor 35 makes one revolution, a crank lever 49 causes a shutter charge lever 50 to make a reciprocating motion once. As a result, the lever 50 pushes a top curtain protrusion 32a to charge the top curtain 32 against the force of the spring 40, while a bottom curtain protrusion 34a is pushed by the top curtain 32 so that the bottom curtain 34 is charged against the force of the spring 42 together with the top curtain 32. A shutter switch 33 is turned on when the top curtain 32 is elastically charged, and it is turned off when the top curtain 32 runs.

The quick return mirror 15 is turned (swung) about a mirror rotary shaft 29b secured to the rear edge thereof. The aforementioned top curtain unlocking lever 29c is fixedly secured to the mirror rotary shaft 29b. A coil spring 29b is wound on the shaft 29b to urge the quick return mirror 15 downwardly. A mirror up lever 37 and a mirror down lever 44 are slidably provided on the side of the mirror box. The mirror up lever 37 is pulled by a spring 38 forwardly in FIG. 3, and the mirror down lever 44 is pulled by a spring 45 backwardly in FIG. 3. A mirror up locking pawl 36 is provided to regulate the movement of the mirror up lever 37. A release magnet 29 causes the pawl 36 to engage with and disengage from the mirror up lever 37. A sloped surface 37a formed on the rear part of the mirror up lever 37 is engaged with a pin 29a protruding from the side of the quick return mirror so that the quick return mirror is lifted as the mirror up lever 37 is slid forwardly by the spring 38. At the end of the run, the pin 34a protruding from the bottom curtain strikes a mirror down lever locking pawl 43 to free the mirror down lever 44, and the mirror down lever 44 moves the quick return mirror 15 downwardly. A mirror switch 30 is provided for the quick return mirror 15. The switch 30 is turned on when the mirror 15 starts rising, and it is turned off when the mirror 15 starts dropping. The mirror down lever 44 and the mirror up lever 37 are elastically charged by a mirror charge lever 48 which is swung through a certain angle by a gear 47 which is engaged with the gear 46 of the aforementioned motor 35. Accordingly, the above-described operation is carried out by controlling the bottom curtain releasing magnet 31 and the release magnet 29 as described above.

FIG. 4 shows a specific example of a circuit for driving the bottom curtain releasing magnet 31 and the release magnet 29 when the still picture photographing mode is switched over to the motion picture photographing mode and vice versa.

As shown in FIG. 4, the still motion changeover switch 18 is a gang switch including separate switches 18a, 18b and 18c used to simultaneously perform the selection of one of the still picture exposure control device 25 and the motion picture exposure control device 26, the selection of one of the memory units 28a and 28b of the memory device 28, and the switching of the bottom curtain releasing magnet 31. When the armatures of the changeover switch 18 are at the still picture positions (S), the output of an inverter 51 is set to an L (low) logic level through the switch 18c, and therefore a D flip-flop 52 is not set. When, under this condition, a shutter release switch 53 is turned on, the output of an inverter 61 is raised to a H (high) logic level, and therefore the noninverting output terminal Q of a D flip-flop 52 is held at H. As the terminal Q of the flip-flop 52 is connected to the clock terminal of a D flip-flop 54, the noninverting output terminal of the latter is also held at H. The output of the noninverting terminal of the D flip-flop 54, being delayed by a delay circuit composed of a resistor 55 and a capacitor 56, is applied to the reset terminal R of the D flip-flop 54. Therefore, a pulse signal is provided at the inverting terminal Q of the D flip-flop 54. The pulse signal thus provided is applied through an inverter 57 and a transistor 58 to the release magnet 29 to momentarily turn on the latter. This operation of the release magnet 29 releases the quick return mirror 15 locked in the photographing optical path. More specifically, when the release magnet 29 is activated, the mirror up locking pawl 36 is disengaged from the mirror up lever 37, as a result of which the lever 37 is slid forwardly by the spring 38 and the sloped surface 37a, lifting the pin 29a and accordingly the quick return mirror 15. At the beginning of the rising of the mirror 15, the mirror switch 30 is turned on, and simultaneously the bottom curtain locking magnet 31 is activated to lock the bottom curtain 34.

When the quick return mirror 15 is completely raised, the top curtain unlocking lever 29c strikes the top curtain locking pawl 39 to cause the latter to disengage from the top curtain 32, as a result of which the top curtain 32 is run by the spring 40. Moreover, the lens stop drive circuit 22 causes the lens stop drive device 23 to set the degree of opening of the aperture opening and closing mechanism 13 to a desired value.

On the other hand, the terminal X of the still picture exposure control circuit 25 is held at H. The H signal is applied through the OR gate 59 and the transistor 60 to the bottom curtain releasing magnet 31 so that the latter is held energized. When the exposure time calculated by the control circuit 25 has passed, the signal at the terminal X is set to L, and accordingly the output of the OR gate 59 is set to L and the transistor 60 is rendered nonconductive, as a result of which the magnet 31 is deenergized and the bottom curtain 34 is run as described before. Thus, exposure has been accomplished. During the exposure time, electric charge is accumulated in the image sensor 17 according to the picture which is being scanned by the image sensor drive circuit 24 and the video signal is stored in the memory device 28 as described above.

When the armatures of the still motion changeover switch 18 are moved to the motion picture positions (V), the output of the inverter 51 and the output of the OR gate 59 are raised to H, as a result of which the transistor 60 is rendered conductive. Therefore, the bottom curtain releasing magnet 31 is energized to prevent the running of the bottom curtain 34. When the output of the inverter 51 is raised to H as described above, the D flip-flop 52 is set and the output at its noninverting output terminal Q is raised to H. Therefore, the pulse signal is provided at the inverting output terminal Q of the D flip-flop 54 as in the still picture photographing mode. The pulse signal is applied through the inverter 57 and the transistor 58 to the release magnet 29 to momentarily energize the latter. Accordingly, the quick return mirror 15 starts rising. When the mirror 15 has been completely raised, the top curtain 32 of the focal plane shutter 16 starts running.

As the bottom curtain is not run, the focal plane shutter is held open to permit the motion picture photographing operation.

On the other hand, in response to the output of the image sensor 17, the motion picture exposure control circuit 26 provides a signal corresponding to the average luminance of the image. The signal is applied to the lens stop drive circuit 22 so that a lens stop drive signal is produced which varies as shown in FIG. 2. The lens stop drive signal drives the lens stop drive device 23 to continuously change the degree of opening of the aperture opening and closing mechanism 13. As a result, a video signal of correct exposure can be obtained. When, under this condition, the release switch 53 is turned on, the output of the inverter 61 is raised to H, and the output of the AND gate 62 is also raised to H. Therefore, a semiconductor switch 63 is also raised to H. Therefore, a semiconductor switch 63 is turned on, and hence the motion picture signal is stored in the memory unit 28b.

In the above-described circuit, the still motion changeover switch 18 is made up of three switches which are operated simultaneously; however, it may be implemented with semiconductor devices. Furthermore, in the above-described embodiment, when the bottom curtain releasing magnet 31 is energized, the bottom curtain 34 is held stopped; that is, the focal plane shutter 16 is a so-called "demagnetization-type shutter". However, if the circuit is modified, the technical concept of the invention is applicable to a so-called "magnetization-type shutter" in which the bottom curtain is unlocked when the bottom curtain releasing magnet is energized by a pulse signal. With the magnetization-type shutter, it is unnecessary to apply current to the bottom curtain releasing magnet during the motion picture photographing operation. Thus, the use of the magnetization-type shutter is advantageous with regard to the economical use of current.

As it is clear from the above description, the electronic camera according to the invention has an image reflecting mirror. Therefore, in the still picture photographing operation, a bright image of the object can be observed through the viewfinder, and the video signal output is less attenuated. Upon selection of the motion picture photographing mode, the image reflecting mirror is automatically retracted from the photographing optical path so that the focal plane shutter is maintained open. Thus, the still picture photographing operation and the motion picture photographing operation can be switched over to each other with ease. The image reflecting mirror drive mechanism and the focal plan shutter drive mechanism are used both for the still picture photographing operation and for the motion picture photographing operation. In addition, the shutter release switch is also used for both photographing operations. Therefore, the arrangement of the electronic camera is simplified with respect to the prior art. When the motion picture photographing mode is selected, the degree of opening of the aperture opening and closing mechanism is changed according to the luminance of the object's image. Also in the still picture photographing operation, the focal plane shutter controls the exposure. Therefore, the electronic camera is free from the danger of a high intensity light beam being erroneously applied to the image pickup element.

We claim:

1. An electronic camera in which a still picture photographing operation and a motion picture photographing operation can be switched over to each other, comprising:
    an image reflecting mirror for introducing a light beam passing through a photographing lens to viewfinder means in a still picture photographing operation;
    a first drive mechanism for driving said image reflecting mirror;
    a still picture photographing focal plane shutter disposed in front of an image pickup device;
    a second drive mechanism for driving said focal plane shutter;
    a changeover switch for selecting between said still picture photographing operation and said motion picture photographing operation; and
    a shutter release switch used for both of said photographing operations,
    said first drive mechanism being activated to retract said image reflecting mirror from the photographing optical path when said still picture photographing operation is switched over to said motion picture photographing operation and when said shutter release switch is turned on in said still picture photographing operation, and
    said second drive mechanism causing said shutter to be open when said motion picture photographing operation is selected by said changeover switch.

2. The electronic camera as claimed in claim 1, further comprising an aperture opening and closing mechanism for continuously setting an aperture value provided by said photographing lens according to a luminance of an object, said aperture opening and closing mechanism starting setting said aperture value when said motion picture photographing operation is selected by said changeover switch.

3. The electronic camera as claimed in either of claims 1 and 2, wherein said focal plane shutter comprises a top curtain and a bottom curtain; further comprising a bottom curtain releasing magnet; and wherein a top curtain of said focal plane shutter is released in response to retraction of said image reflecting mirror from said photographing optical path, and a bottom curtain is released by current application control of said bottom curtain releasing magnet, said bottom curtain releasing magnet preventing release of said bottom curtain when said motion picture photographing operation is selected by said changeover switch.

4. The electronic camera as claimed in either one of claims 1 and 2, further comprising a spring, a force of retracting said image reflecting mirror from said photographing optical path being provided by elastically charging said spring; a release magnet; and a member for holding said mirror in said photographing optical path against said force controlled in such a manner that said member releases said mirror by current application control of said release magnet.

5. The electronic camera as claimed in claim 4, further comprising means for controlling said release magnet in such a manner that said release magnet releases said image reflecting mirror when said motion picture photographing operation is selected by said changeover switch and when said shutter release switch is turned on in said still picture photographing operation.

* * * * *